US012743947B1

(12) United States Patent
Fang et al.

(10) Patent No.: US 12,743,947 B1
(45) Date of Patent: Sep. 22, 2026

(54) SECURITY ALERT GENERATION USING SENSOR DATA

(71) Applicant: Zoom Video Communications, Inc., San Jose, CA (US)

(72) Inventors: Jin Fang, Saratoga, CA (US); Hainan Wang, San Jose, CA (US); Qing Wang, San Jose, CA (US)

(73) Assignee: Zoom Communications, Inc., San Jose, CA (US)

(*) Notice: Subject to any disclaimer, the term of this patent is extended or adjusted under 35 U.S.C. 154(b) by 121 days.

(21) Appl. No.: 18/630,643

(22) Filed: Apr. 9, 2024

(51) Int. Cl.
*G08B 29/16* (2006.01)

(52) U.S. Cl.
CPC .................................... *G08B 29/16* (2013.01)

(58) Field of Classification Search
CPC ...................................................... G08B 29/01
See application file for complete search history.

(56) References Cited

U.S. PATENT DOCUMENTS

2022/0254366 A1* 8/2022 Morikuni ............. G06N 3/0455
2023/0223038 A1* 7/2023 Shastry ............... G10L 15/1815 704/235
2024/0135796 A1* 4/2024 Netscher ............ G08B 21/0476

FOREIGN PATENT DOCUMENTS

WO WO-2021226568 A1 * 11/2021 ............ G06N 20/00

OTHER PUBLICATIONS

PeerJ Computer Science, State-of-the-art violence detection techniques in video surveillance security systems: a systematic review, https://peerj.com/articles/cs-920/, Batyrkhan Omarov et al., Apr. 6, 2022, 41 pages.
Wikipedia, Object detection, https://en.wikipedia.org/wiki/Object_detection, retrieved from internet Mar. 26, 2024, 4 pages.
Viisights, Violence Prediction and Recognition for Video Security Applications, https://www.viisights.com/products/wise/violent-activity/, retrieved from internet Feb. 19, 2024, 5 pages.
Abto Software, Violence Detection for Smart Surveillance Systems, https://www.abtosoftware.com/blog/violence-detection, Aug. 1, 2018, 6 pages.

* cited by examiner

*Primary Examiner* — Quan Zhen Wang
*Assistant Examiner* — Rajsheed O Black-Childress
(74) *Attorney, Agent, or Firm* — Young Basile Hanlon & MacFarlane. P.C.

(57) ABSTRACT

A computing device receives streaming data from one or more security sensors at a geographic location, the one or more security sensors comprising at least one of a camera, a microphone, or a thermal sensor. The computing device determines, by an artificial intelligence engine, an event occurring at the geographic location based on the streaming data based on receiving the streaming data, the artificial intelligence engine including at least one convolutional neural network and at least one transformer. The computing device transmits, to an output device, an alert corresponding to the event.

20 Claims, 8 Drawing Sheets

SECURITY ALERT GENERATION USING SENSOR DATA

FIELD

This disclosure relates to systems and methods for generating security alerts using sensor data. The security alerts may be generated using artificial intelligence software or hardware.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
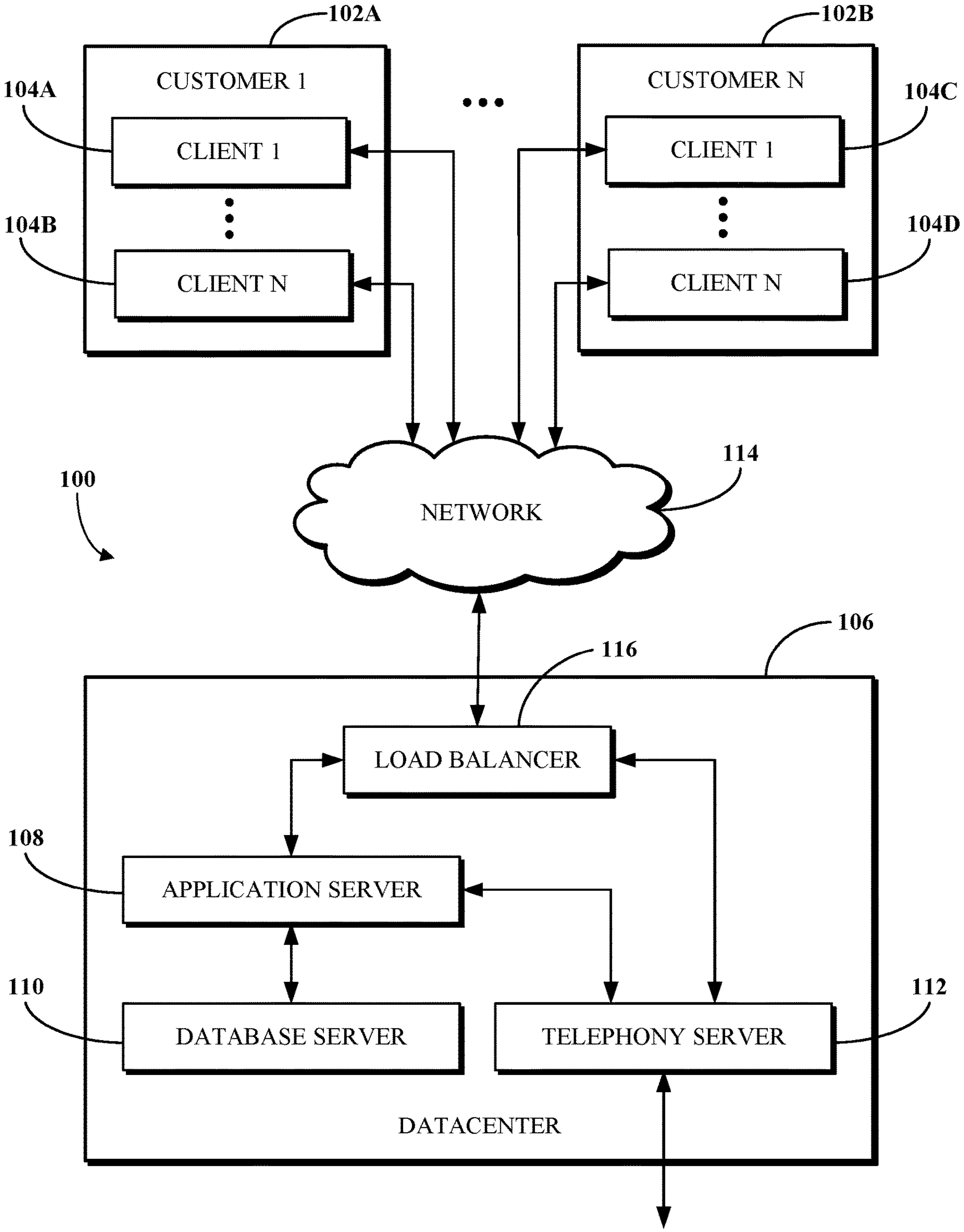
FIG. 1 is a block diagram of an example of an electronic computing and communications system.

A security camera may be used to secure a geographic location, for example, an office building, an apartment building, a single-family home, a school, a parking lot, a hotel building, a shopping mall, or a hospital. The security camera may be used as a video capture tool, and a live video feed from the security camera may be monitored by a security guard. The monitoring of the video feed by the security guard may be expensive (e.g., as the security guard is to be paid) and/or error prone (e.g., the security guard may be momentarily distracted or may not be trained to identify certain threats). Techniques for automatically monitoring the video feed may be desirable.

Implementations of this disclosure address problems such as these using artificial intelligence (AI) technology for generating security alerts. A geographic location may be secured by one or more security sensors observing activity at the geographic location. The security sensors may include at least one of a camera (e.g., at least one of a visual spectrum camera, an infrared camera, or an ultraviolet camera), a microphone, a thermal sensor (e.g., a body/object temperature sensor), or a visible light sensor. One or more computing devices (e.g., a server or a personal computing device) receive streaming sensor data from the one or more security sensors. The computing devices include an AI engine. The AI engine determines an event occurring at the geographic location based on the streaming sensor data in real-time upon receiving the streaming sensor data. The one or more computing devices transmit, to an output device (e.g., a client device of a security guard), an alert indicating the event. For example, the alert may include an image of the event and text, generated by the AI engine, describing the event.

The AI engine may include one or more AI sub-engines that process the streaming sensor data and that communicate with one another in order to increase the accuracy of their predictions. For example, the AI engine may include a first convolutional neural network (CNN) that recognizes human bodies, specific humans (e.g., Ben Bitdiddle, who is an employee of Acme Corporation, which rents office space in the building), or other visual objects in the streaming sensor data. The AI engine may include a second CNN that processes non-verbal audio (e.g., sneezing, coughing, thunder, police siren, window/glass/door breaking, or gunshot). Verbal audio in a natural language may be transformed to text using speech-to-text technology, and may be further processed using a transformer engine (e.g., a large language model (LLM) or a generative pretrained transformer (GPT)) for natural language processing (NLP) in order to determine the meaning of the verbal audio and whether it is associated with a threat. Another engine (e.g., a rule-based engine or a CNN) may process the thermal data from the thermal sensor to determine whether the thermal data is associated with a person (or an animal) being angry or sick (e.g., with flu-like symptoms).

For example, determining that a first fight is ongoing may include at least one of: identifying, by the first CNN, people in the visual data from the camera; identifying, by the second CNN, non-verbal sounds associated with first fighting (e.g., grunting or fists hitting human bodies); identifying, by the transformer engine, that verbal speech detected by the microphone is consistent with a first fight; or determining, by the thermal data processing engine, that the body temperature of the people is consistent with being angry or fighting. If multiple of these things are detected, the AI engine may increase its confidence that a first fight is ongoing and may accordingly cause an alert to be transmitted to an output device. Similar techniques may be used to determine that a fight with weapons (e.g., knives or guns) is ongoing. For example, AI techniques may be used to identify the shape or type of a weapon, a person's posture using the weapon, and/or a person's wound (e.g., a wound location, presence of bleeding or severe bleeding, or a person lying on the ground).

As used herein, the phrase "natural language" may include a language that is spoken or written by humans and that evolved naturally through its use by humans. A natural language may be distinct from a formal logical language or from a programming language. Examples of natural languages include, without limitation, at least one of English, French, Spanish, Chinese, Japanese, or Korean. A natural language may include a combination of two or more spoken or written languages (e.g., colloquially, Spanglish, which combines English words and Spanish words into a single phrase or sentence).

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

Some implementations of the present disclosure involve obtaining and/or storing private data of users (e.g., imagery and/or audio from a security camera at a user's home). It should be noted that affirmative consent of users is obtained for the storage of their private data, and users may withdraw consent at any time, in which case such data becomes purged. Furthermore, users are persistently notified (e.g., via on-screen icons or via email messages) that their data is being obtained and/or stored based on their previously-granted consent.

To describe some implementations in greater detail, reference is first made to examples of hardware and software structures used to implement security alert generation using sensor data. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
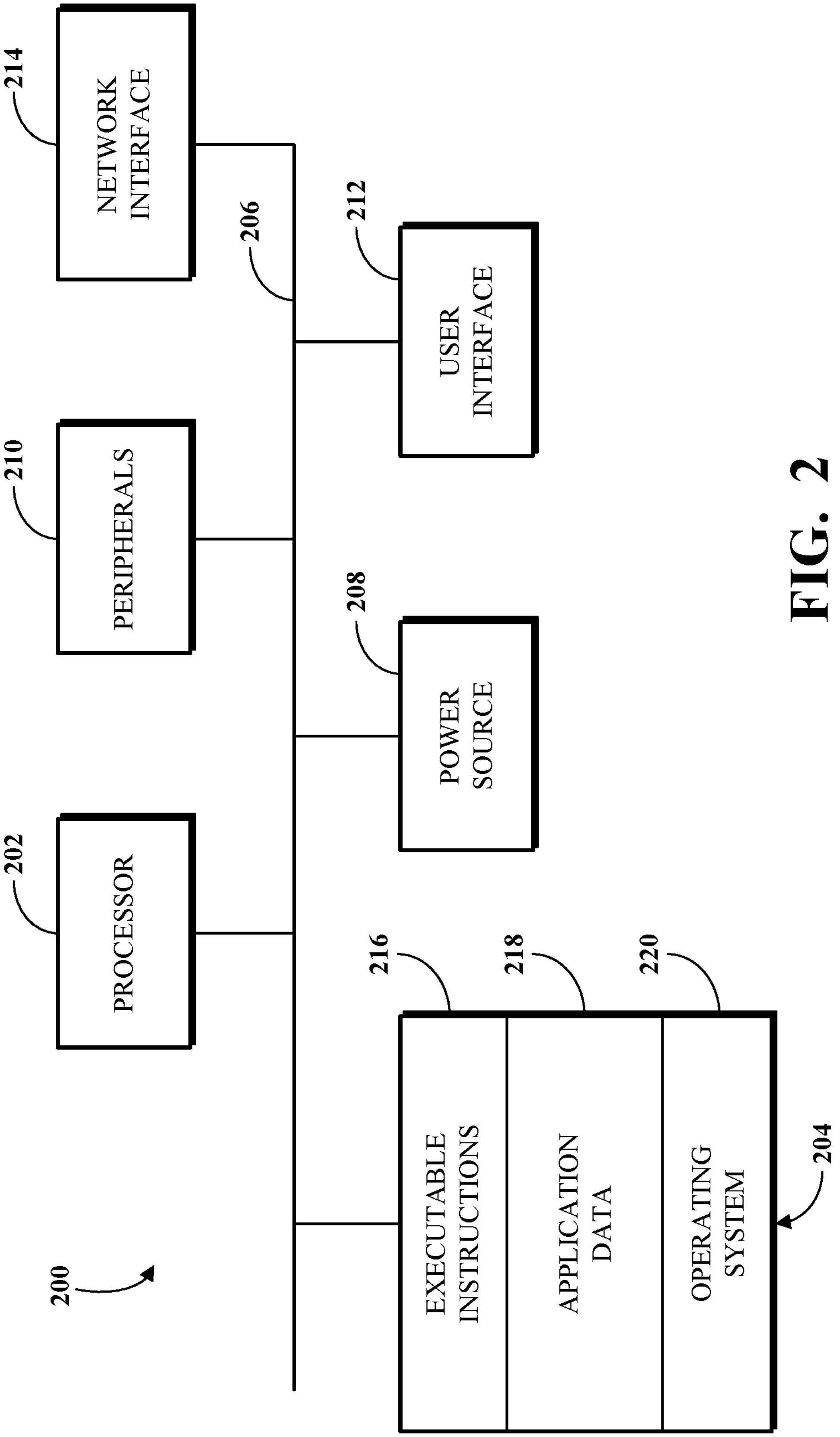
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
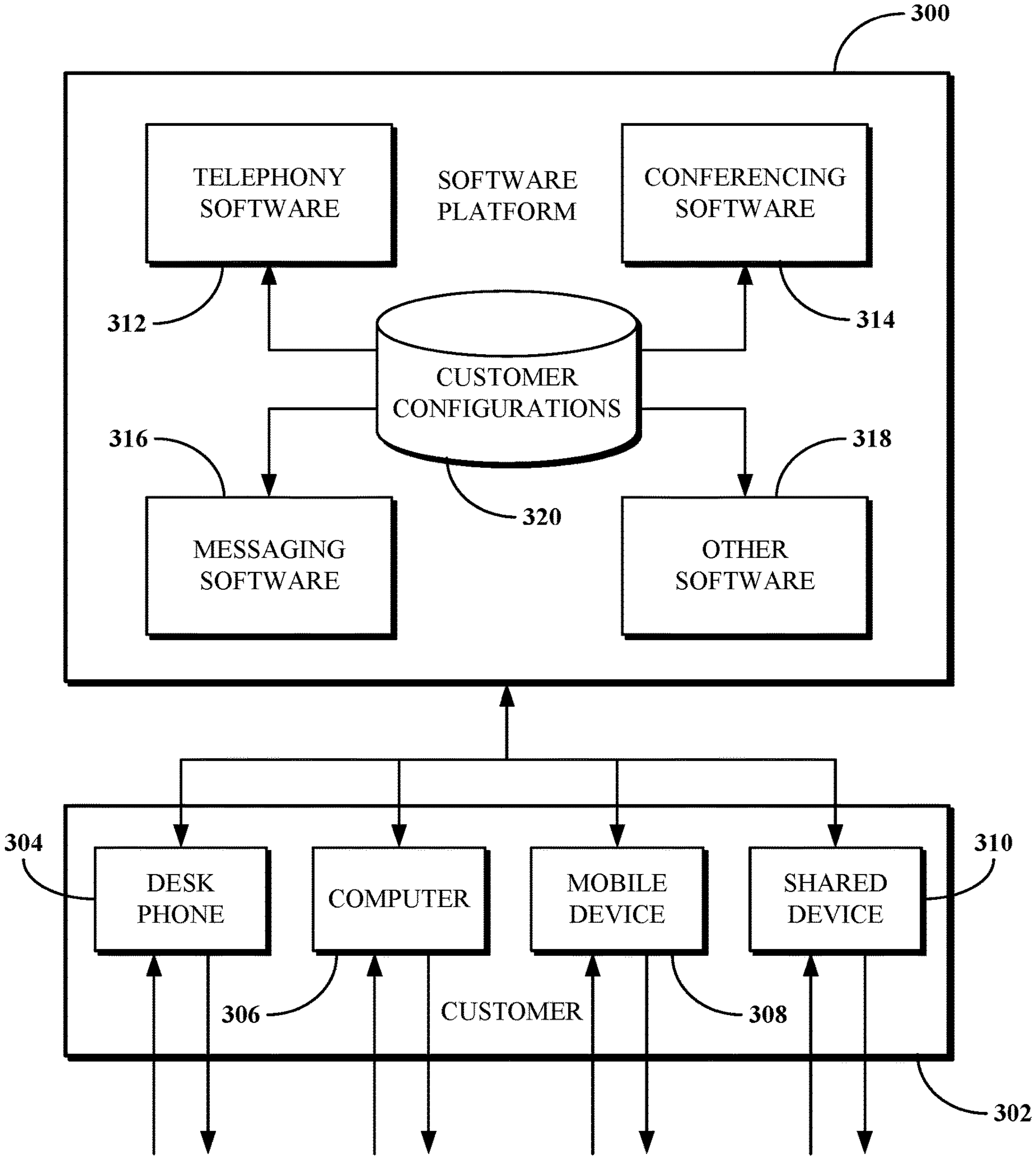
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, visitor management software, or the like. In one particular example, the other software 318 can include software for security alert generation using sensor data.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients.

Figure 4:
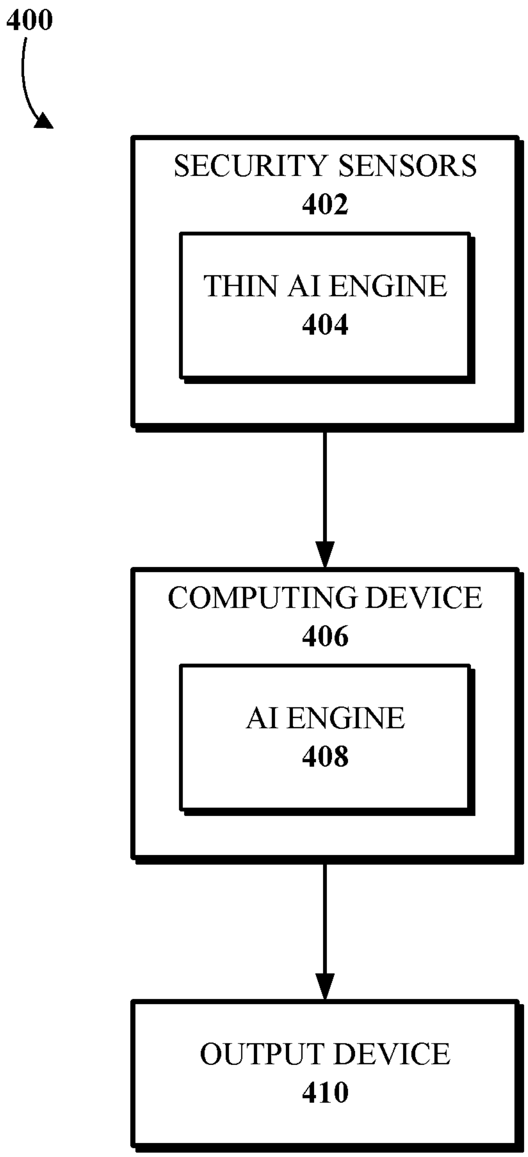
FIG. 4 is a block diagram of an example of a system for security alert generation.

FIG. 4 is a block diagram of an example of a system 400 for security alert generation. As shown, the system 400 includes security sensors 402 comprising a thin AI engine 404, a computing device 406 comprising an AI engine 408, and an output device 410.

The security sensors 402 may include different types of security sensors. For example, the security sensors 402 may include at least one of a camera, a microphone, or a thermal sensor. The camera may be at least one of a visual field camera, an infrared camera, an ultraviolet camera, or a light sensor. While the system 400 is described as including multiple security sensors 402, in some implementations, only a single security sensor (e.g., a single camera) may be used. The security sensors 402 may be wired to an electric grid, battery powered, and/or solar-powered. The security sensors 402 may be integrated with one another or may operate separately and/or independently from one another.

The security sensors 402 may include, among other things, motion sensors. The motion sensors may be passive infrared (PIR) sensors that detect changes in infrared radiation (e.g., heat) by moving objects such as people or animals. The motion sensors may be microwave sensors that emit microwave pulses and measure reflections to detect changes in the environment caused by movement. The motion sensors may use radar or light detection and ranging (LIDAR) technology to measure the speed of moving objects. The motion sensors may include two or more of the above technologies.

The security sensors 402 may include, among other things, contact sensors. The contact sensors may include magnetic reed switches that include a magnet and a switch and are attached to a movable object, such as a door or a window. When the movable object is moved, (e.g., the door or the window is opened) the magnetic field is broken, triggering the contact sensor.

The security sensors 402 may include environmental sensors, for example, at least one of smoke detectors configured to detect the presence of smoke or fire, carbon monoxide sensors configured to detect the presence of carbon monoxide, flood sensors configured to detect water leaks or flooding, or glass break sensors configured to detect sound, light, or other frequencies associated with shattering glass.

The security sensors 402 may include one or more cameras. The cameras may include a visual spectrum camera configured to capture visible (to a human eye) light. The cameras may include an infrared camera configured to capture infrared light, allowing for vision in low-light conditions. The cameras may include a thermal camera configured to detect a heat signature and create an image based on temperature variations in the heat signature.

The security sensors 402 may include other types of sensors. For example, the security sensors 402 may include at least one of a microphone, a light sensor, a pressure sensor, or a vibration sensor. The microphone may be configured to detect unusual sound levels or specific noises (e.g., breaking glass) the light sensor may detect changes in light levels, which may be useful for triggering other security devices or for monitoring unauthorized access to a space. The pressure sensor may detect changes in pressure, which may be associated with an intruder's weight on a floor or a specific surface. The vibration sensor may detect vibrations associated with footsteps or tampering with a secured object.

The security sensors may observe activity at a geographic location which is to be secured by the security sensors. For example, the geographic location may correspond to an entrance to a home, an entrance to a business (e.g., a storefront, a front desk of an office tower, or a front desk of a hotel), a parking garage, or a location to be secured by police or government officials, such as a municipal parking lot, a public park, or a town square. It should be noted that the geographic location is not limited to the entrance and the disclosed technology may be implemented in various locations of businesses, schools, hotels, shopping malls, or other places. For example, the disclosed technology may be implemented inside a tavern, inside a jewelry store, in the lobby of a bank, in an elevator of a hotel or an office building, at a teller's desk of a bank, in a classroom of a school, in a lecture hall of a university, in a school cafeteria, in a hallway of a shopping mall, or in other places.

As shown, the security sensors 402 include a thin AI engine 404. The thin AI engine 404 may be configured to execute on the security sensors 402, with the limited processing circuitry, memory hardware, and/or battery power available on the security sensors 402. For example, the thin AI engine 404 may be a rule-based engine or a CNN that includes less than a threshold number (e.g., 10 or 20) of layers and/or is otherwise configured to reduce its processing circuitry, memory hardware, and/or battery power usage. In some cases, the thin AI engine 404 may implement classic techniques and/or non-neural techniques for identifying objects or human body features (e.g., faces). Examples of non-neural techniques that may be implemented by the thin AI engine 404 may include at least one of a Viola-Jones object detection framework (e.g., based on Haar features), scale-invariant feature transform (SIFT), or histogram of oriented gradient (HOG) features. Examples of neural network techniques that may be implemented by the thin AI engine 404 include at least one of region proposals (e.g., R-CNN, fast R-CNN, faster R-CNN, or cascade R-CNN, single shot multibox detector (SSD), single shot refinement neural network for object detection (RefineDet), Retina-Net, or a deformable convolution network.

In some cases, the thin AI engine 404 is configured to detect an anomaly in the sensor data that might be associated with a security event. Upon detecting the anomaly, the thin AI engine 404 may generate an output, for transmission to the computing device 406, triggering the computing device 406 to revie the anomaly and determine whether the anomaly is associated with the security event. Examples of anomalies that might be detected by the thin AI engine 404 include temperature anomalies of moving entities or a moving entity moving at a speed exceeding a threshold speed.

The thin AI engine 404 may be trained to identify the anomalies using supervised learning, unsupervised learning, or semi-supervised learning applied to a dataset. The dataset may include intentionally generated data associated with the anomaly (e.g., a group of actors are asked to get in a fight to provide the thin AI engine 404 with an example of a fight) and/or publicly available data from government or other sensors that are shared with the public. For example, some governments have cameras showing traffic conditions (e.g., on a highway) or activity (e.g., in a town square) that are shared with the public via the Internet. Data from these cameras may be used for training the thin AI engine, with some of the data being manually labeled by human reviewers who are responsible for training the thin AI engine 404.

Sensor data from the security sensors 402 and/or outputs of the thin AI engine 404 are provided to the computing device 406. The computing device 406 receives the sensor data and/or the outputs of the thin AI engine 404. The computing device 406 may be a server or a client device, for example, at least one of a laptop computer, a desktop computer, a mobile phone, or a tablet computer. The computing device 406 includes an AI engine 408. The AI engine 408 is configured to determine, based on the sensor data and/or the output of the thin AI engine 404, an event occurring at a geographic location where the security sensors 402 are located. The event may be associated with a security threat to which security personnel may be alerted. For example, the event may correspond to a fight, an unauthorized person entering or attempting to enter a location, unauthorized activity (e.g., suspected criminal activity), or a person with flu-like symptoms being in the geographic location observed by the security sensors 402. In some cases, the specific events to be detected by the AI engine 408 may be configured by an administrator or a user of the computing device 406. The administrator or the user of the computing device 406 may be able to select, via a user interface, a subset of a set of events and/or a set of persons (e.g., positively or negatively identified by name, photograph, and/or social media profile) associated with the events. For example, a homeowner may wish to be notified if a specific person (e.g., a stalker) appears outside their home, a business may wish to be notified if persons who are not employees of the business enter a secure area of the business. The AI engine 408 may be more complex and capable of calculations that require more processing circuitry, memory hardware, and/or battery power than the thin AI engine 404. For example, the AI engine may include at least one of a rule-based engine, a CNN, a deep neural network (DNN), or a transformer (e.g., a GPT or an LLM).

As described above, an event may be associated with a positive or negative identification of a person. A positive identification states that a person is a specific person (e.g., Ben Bitdiddle) or a member of a set of persons (e.g., a member of a set of tellers at the 123 Main Street branch of ABC Bank). A negative identification states that the person is not a specific person (e.g., not Ben Bitdiddle) or not a member of the set of persons (e.g., not a member of the set of tellers at the 123 Main Street branch of ABC Bank).

In some cases, the AI engine 408 includes a CNN for human body recognition, a transformer engine for natural language audio processing, and a CNN for non-verbal audio signal processing. The AI engine 408 may implement any of the neural network, non-neural, and/or classic technologies described above in conjunction with the thin AI engine 404. The event is determined based on a combination of the output of the CNNs and the output of the transformer. For example, a multimodal engine, which may be a sub-engine of the AI engine 408, may receive the output of the CNNs and the transformer engine and may determine the event based on those outputs. The multimodal engine may itself include at least one of a CNN, a DNN, or a transformer.

Upon the AI engine 408 determining that the event is ongoing or has recently transpired, the computing device 406 transmits an alert corresponding to the event to the output device 410. The output device 410 may be a display device of the computing device 406 or may be another device (e.g., a device associated with a messaging address, such as an email address or mobile telephone number, or a device configured to receive notifications (e.g., push notifications) associated with the security sensors 402 from the computing device 406. In some cases, the output device 410 is associated with a security guard, a police officer, or a person responsible for maintaining a geographic location associated with the security sensors (e.g., a homeowner or a business leader associated with that geographic location). In some cases, the output device is a client device of security personnel or a messaging server for communicating with the security personnel via a messaging application. The messaging application may be an email application, a text messaging application, or an instant messaging application that may be used for communication between two or more human users. The alert may include imagery of the event and/or text describing the event, such that a user viewing the alert may determine an appropriate response to the event.

In some implementations, the AI engine 408 includes a GPT engine, for example, to process natural language speech (which is converted to text by a speech-to-text engine that may also be included in the AI engine 408). In some cases, the GPT engine that is trained using a two-phase process including the phases of pretraining and finetuning. In the pretraining phase, the GPT engine is trained on a dataset of publicly available (e.g., from the Internet) text or audio/video data that is converted into text using speech-to-text technology. The dataset of publicly available text may include text that is distinct from natural language obtained by the security sensors 402. For example, the dataset of publicly available text may include at least one of newspaper articles, blog posts, publicly available social media post, or encyclopedia articles. The text is used to create a language model that learns to predict the next word in a sentence given the context of the previous words. The transformer architecture, specifically the self-attention mechanism, is used to capture dependencies between words and create a representation of the text.

During pretraining, the GPT engine learns to generalize the patterns it observes in the training data. Specifically, the GPT engine learns grammar, facts, reasoning abilities, and some level of world knowledge. The pretraining phase allows the GPT engine to acquire a broad understanding of the natural languages in which the GPT engine is trained.

During the finetuning phase, after pre-training, the GPT engine is further finetuned on specific tasks (e.g., identifying an event from natural language text obtained from audio obtained via the security sensors 402) using labeled examples. The labeled examples may be publicly available audio or video recordings of events (e.g., fights, burglaries, or robberies). The manually generated data is generated specifically for training the GPT engine and the users manually generating the data are aware of this planned use. The labeled examples may include labels of desired outputs that the GPT is to generate based on the inputs. For example, the labeled examples may include natural language text that is properly associated or not associated with a given event. For example, a transcript of words spoken in a video of a first fight may be properly mapped to the event "fist fight," while a transcript of words spoken by two friends walking together down the street might not be properly mapped to the event "fist fight." The finetuning phase makes the GPT engine useful for specific applications, such as identifying the events from the natural language text. Finetuning involves training the GPT engine on a narrower dataset that may be generated with the help of human reviewers. Specifically, an entity associated with the finetuning process might hire human reviewers (e.g., members of a quality assurance department) to generate the narrower dataset, for example, by recording a video of actors involved in a burglary of a store. As a result, the entity does not rely on user data in training the GPT (or other AI/ML) technology.

The finetuning phase includes providing prompts or instructions to the GPT engine and receiving responses from the GPT engine. For example, the GPT engine may be prompted to review publicly available videos and determine which of those videos correspond to events. The human reviewer then reviews the output generated by the GPT engine and score the output according to the various qualities (e.g., did the GPT engine correctly identify the videos including the events). The GPT engine uses reinforcement learning to attempt to improve its scores on each (or at least a subset) of the qualities as the finetuning process progresses.

As illustrated in FIG. 4, the security sensors 402 are different from the computing device 406, the security sensors 402 are different from the output device 410, and the computing device 406 is different from the output device 410. In alternative implementations, two or more of the security sensors 402, the computing device 406, or the output device 410 may reside on the same computing machine.

Figure 5:
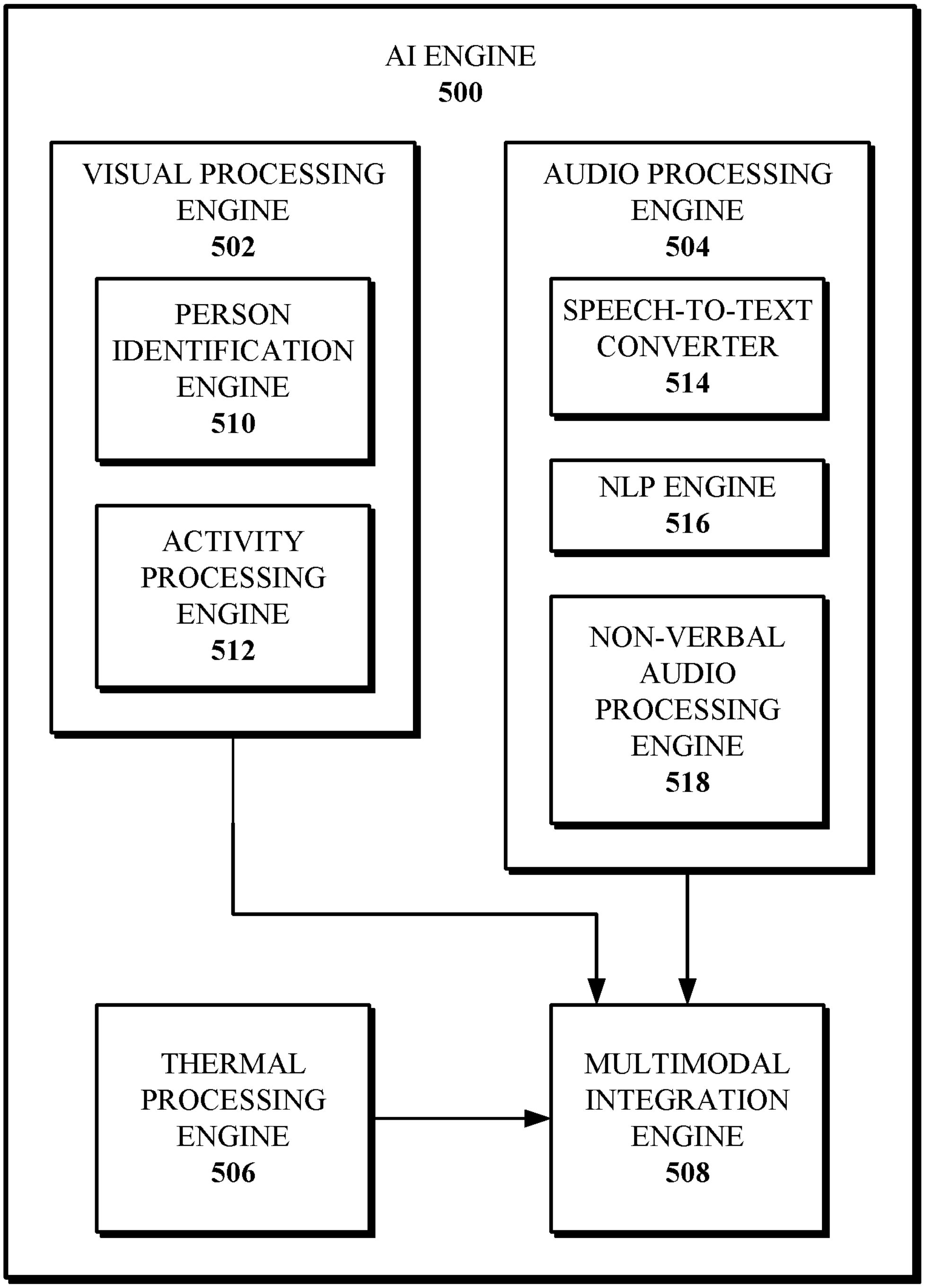
FIG. 5 is a block diagram of an example of an artificial intelligence engine for security alert generation.

FIG. 5 is a block diagram of an example of an AI engine 500 for security alert generation. The AI engine 500 may correspond to the AI engine 408 of FIG. 4.

As shown, the AI engine 500 includes a visual processing engine 502, an audio processing engine 504, a thermal processing engine 506, and a multimodal integration engine 508. The visual processing engine 502 processes visual data from the security sensors 402. The audio processing engine processes audio data from the security sensors 402. The thermal processing engine processes thermal data from the security sensors 402. The multimodal integration engine 408 receives the outputs from at least one of the visual processing engine 502, the audio processing engine 504, or the thermal processing engine 506 and combines the received outputs into predictions of one or more events that are taking place in a geographic location being observed by the security sensors 402.

The AI engine 500 is illustrated as including the visual processing engine 502, the audio processing engine 504, and the thermal processing engine 506. However, in some cases, the AI engine 500 may include a subset of those engines and/or other engines for processing data from other sensors (e.g., a pressure sensor or an electromagnetic field (EMF) sensor) of the security sensors 402.

The visual processing engine 502 receives, as input, visual data from the security sensors 402 and outputs an event predicted based on the visual data. The audio processing engine 504 receives, as input, audio data from the security sensors 402 and outputs an event predicted based on the audio data. The thermal processing engine 506 receives, as input, thermal data from the security sensors 402 and outputs an event predicted based on the thermal data. The outputs of at least one of the visual processing engine 502, the audio processing engine 504, or the thermal processing engine 506 are provided to the multimodal integration engine 508.

The multimodal integration engine 508 receives the events predicted by at least one of the visual processing engine 502, the audio processing engine 504, or the thermal processing engine 506 and, in some cases, probabilities or scores associated with those events. The multimodal integration engine 508 determines, based on the received events, the probabilities, and/or the scores a likelihood that an event of the events is occurring or has recently occurred in the geographic location associated with the sensor data. The multimodal engine 508 identifies an event (or multiple events) to be included in the output of the AI engine 500 for transmission to the output device 410.

In some cases, the multimodal integration engine might weigh data from some of the other engines more heavily than the data of other engines. For example, in determining that a first fight (or a fight with at least one weapon, such as a knife or a gun) is ongoing, data from the visual processing engine 502 may be weighted more heavily than data from the thermal processing engine 506. In determining that a specific person is present, data from the visual processing engine 502 identifying the specific person's physical features or data from the audio processing engine 504 identifying the specific person's voice might be weighted more heavily than data from the thermal processing engine 506. Alternatively, in identifying temperature-related events, such as the presence of a person with a fever, the presence of a fire, or the presence of snow or ice, data from the thermal processing engine 506 might be weighted more heavily than data from the audio processing engine 504.

As shown, the visual processing engine 502 includes a person identification engine 510 and an activity processing engine 512. The person identification engine 510 may include a CNN that is trained to identify a part of visual data as corresponding to a person, and/or to identify that person as being a specific individual (e.g., Ben Bitdiddle). The CNN may be trained to identify the person using supervised learning, using a training dataset that includes images with persons manually identified therein. The CNN may be provided with at least one stored image of the specific individual (e.g., from Ben Bitdiddle's employee identification badge) and may determine whether the image includes the specific individual based on similarity of visual features of an individual in the image to at least one stored image of the specific individual.

The activity processing engine 512 is configured to process an image or a stream of images and determine activity of the person (or other activity) in the image based on the image or the stream of images. The activity processing engine 512 may include a CNN. The CNN may be trained to determine activities using supervised learning. The supervised learning may be provided with a training dataset that include labeled (e.g., by humans who are employed by an entity performing the supervised learning) images and/or videos of various activities. The activities may include any activities of interest to users of security systems, for example, suspected criminal activity, fighting, aggression, drug use, carrying a weapon, threatening gestures, or threatening movements.

The output of the person identification engine 510 or the activity processing engine 512 may be provided to the multimodal integration engine 508 for further processing and/or integration with output of other engines. Alternatively, the output of the person identification engine 510 or the activity processing engine 512 may correspond to the output of the AI engine 500.

As shown, the audio processing engine 504 includes a speech-to-text converter 514, an NLP engine 516, and a non-verbal audio processing engine 518. The speech-to-text converter 514 is configured to convert speech in an audio recording or in streaming audio to text. The speech-to-text converter 514 may operate in real-time upon receiving audio from the security sensors 402 and may function by breaking down incoming audio into time-contiguous segments (e.g., of 0.25 seconds each or 1 second each). These segments are then passed through a trained acoustic model that maps the audio waveforms to their probable phonemes (the basic units of sound in a natural language). Next, a language model (e.g., a LLM or a GPT) of the speech-to-text converter 514, equipped with vast knowledge of word combinations and grammar, processes the phonemes, predicting the most likely words and sentences based on context and probability. In some cases, the speech-to-text converter 514 uses speaker adaptation techniques, where the software speech-to-text converter 514 over time to individual speech patterns. For example, if the visual processing engine 502 determines that Ben Bitdiddle is present and is speaking at a geographic location observed by the security sensors 402, the speech-to-text converter 514 may take into account stored individual speech patterns of Ben Bitdiddle. (For example, Ben Bitdiddle may be an employee of a business, and the business may, with Ben Bitdiddle's affirmative consent, store individual speech patterns of Ben Bitdiddle, obtained based on recordings of Ben Bitdiddle's speeches or conferences attended by Ben Bitdiddle.) The speech-to-text converter 514 outputs the transcribed text for further processing by the NLP engine 516.

In some cases, if there are multiple speakers, the speech-to-text converter 514 identifies the speakers (e.g., as Speaker 1, Speaker 2, Speaker 3, etc., if the identities of the speaker are unknown or by name or employee identifier if the identities of the speakers are known). In some cases, the identities of the speakers may be determined based on the transcribed text, for example, if a person is referred to as "Jane," the person's name is likely to be Jane. As a result, the transcribed text may include identifiers of speakers as well as the text spoken by the speakers. In one specific example use case, the transcribed text may include: "Ben Bitdiddle: 'This is my office building.' Speaker 1: 'Nice building. On which floor do you work?' Ben Bitdiddle: 'I work on the second floor, Jane.'" It should be noted that, based on the last line of the above transcript, the speech-to-text converter 514 may determine that the name of Speaker 1 is Jane, and may replace "Speaker 1" with "Jane."

The NLP engine 516 may be an LLM or a GPT. The NLP engine 516 may be configured to determine events occurring at the location observed by the security sensors 402 based on the transcribed text generated by the speech-to-text converter. In some examples, the NLP engine 516 is an LLM or a GPT provided with the following prompt in conjunction with the transcribed text: "You are a member of a security team observing the following communication. What security events, if any, do you believe are taking place based on the communication?" In some cases, the prompt may be modified to specify the type of geographic location (e.g., home, office building, hotel, bank, parking garage, or town square) being observed by the security sensors 402. Alternatively, the LLM or the GPT may be specifically trained to identify security events, for example, using the pretraining and finetuning process described above.

The non-verbal audio processing engine 518 is configured to identify events that are associated with non-verbal audio in the audio stream or audio recording obtained from the security sensors 402. The non-verbal audio processing engine 518 may be configured to identify events including, for example, at least one of a dog barking, a wolf howling, a baby crying, an object falling, a window or door being broken, a person screaming in fear or pain, machinery being operated, a telephone ringing, thunder, or rain drops falling. The non-verbal audio processing engine 518 may be a CNN that is trained by supervised learning. The supervised learning may use a dataset including labeled examples of audio recordings of sounds such as the ones mentioned above. The sounds may be recorded in isolation (e.g., a telephone ringing in a quiet room) or in a background with other noise (e.g., a telephone ringing in a noisy office where people are talking).

The non-verbal audio processing engine 518 may process non-verbal aspects of speech in a natural language by a person. For example, the non-verbal audio processing engine 518 may be used to understand key words on which a person is focused in their speech (e.g., if a person slows down or enunciates certain key words). The non-verbal audio processing engine 518 may also determine a tone of a speaker, a volume of a speaker, and/or other non-verbal aspects of speech. For example, if someone is yelling "help," that might be an indication of a critical situations to which security personnel are to be alerted. Along with temperature, voice may also help indicate a person's health condition (e.g., coughing might indicate a flu-like illness). In some cases, the non-verbal audio processing engine 518 may be used to identify a specific person or a member of a set of specific persons by the sound of their voice. For example, if the AI engine 500 resides at a server that has access to a stored recording of Ben Bitdiddle's voice, the non-verbal audio processing engine 518 may be able to use that stored recording to determine whether a person whose voice appears in the sensor data is Ben Bitdiddle. These functionalities may be accomplished, for example, using the CNN trained by supervised learning.

FIG. 5 illustrates an example architecture where the visual processing engine 502, the audio processing engine 504, and the thermal processing engine 506 operate independently and communicate with the multimodal integration engine 508 to have their outputs combined by the multimodal integration engine 508. In alternative implementations, two or more of the visual processing engine 502, the audio processing engine 504, and/or the thermal processing engine 506 may communicate with one another to strengthen their conclusions about detected events.

In one example use case, the security sensors 402 may be observing a tavern. The visual processing engine 502 determines, based on the body language and physical posturing of two men in the tavern that the two men are preparing to engage in a first fight (or a fight with at least one weapon, such as a knife or a gun). The visual processing engine 502 shares its output with the audio processing engine 504. The audio processing engine 504 determines that one of the men used foul language in communicating with the other man, and the other man responded with an angry grunt. Based on this information and the output from the visual processing engine 502, the audio processing engine 504 increases the probability that the two men are preparing for a first fight. The AI engine 408 then generates an output, for transmission to a multimedia messaging service (MMS) address of a mobile phone of a security guard, that a first fight is about to start. The MMS message includes an image or a video of the two men, as well as text explaining that the first fight is predicted to start soon based on the body language, the physical posturing, and the utterances of the two men.

In some example use cases, the disclosed technology may be used to identify an animal escaping (e.g., appearing in an unexpected location or crossing a security line) from a zoo. The audio processing engine 504 may detect animal sounds in a location outside the space where the animal is to roam. The visual processing engine 502 may detect imagery of the animal in a location outside the space where the animal is to roam. The thermal engine 506 may be used to determine the animal's body temperature and determine whether the body temperature is in a normal range for the animal. Furthermore, in residential or commercial areas that are not zoos, the disclosed technology may be used to detect the presence of unexpected or dangerous animals, for example, crocodiles or snakes. In a hospital setting, the disclosed technology may be used to identify symptoms (e.g., body temperature exceeding a threshold, vomiting, bleeding, or great pain) from a patient who is unable to communicate (e.g., an unconscious patient, a patient unable to move, or a baby).

Figure 6:
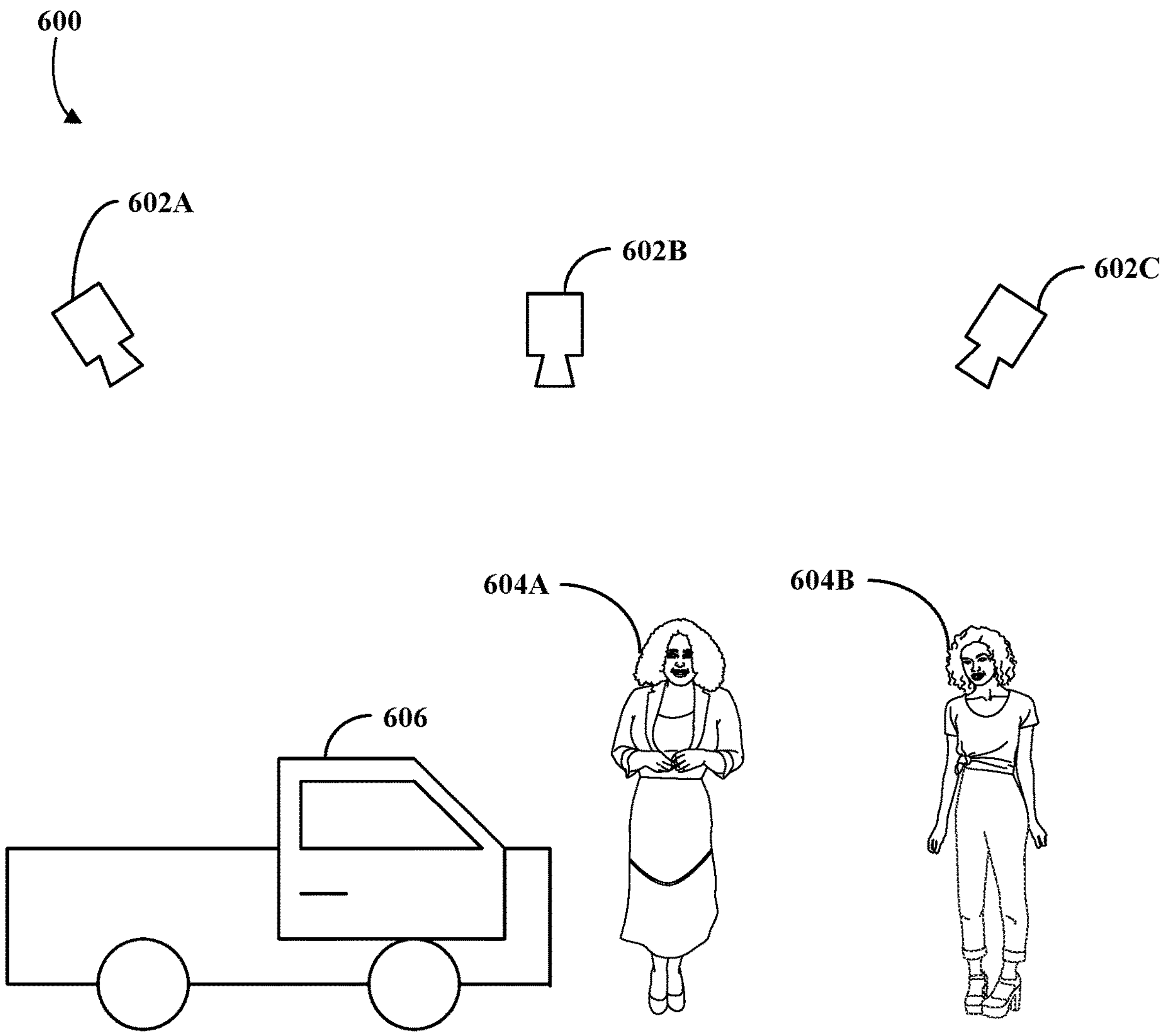
FIG. 6 illustrates an example of a geographic location observed by security sensors.

FIG. 6 illustrates an example of a geographic location 600 observed by security sensors 602A-C. The security sensors 602A-C may correspond to the security sensors 402. As shown, the geographic location 600 includes the security sensors 602A-C observing the scene including two humans 604A-B and a vehicle 606. According to some examples, the geographic location is a parking lot or a garage. The sensors 602A-C may include at least one of a camera, a microphone, a thermal sensor, or another type of sensor. The sensors 602A-C may be stationery or may be configured to rotate and/or move (e.g., along a rail or a wire connected to a wall or a ceiling) to follow the humans 604A-B, the vehicle 606 or another moving object or entity in the scene. As described in conjunction with FIG. 4, the thin AI engine 404 may reside on at least one of the security sensors 602A-C, and the security sensors 602A-C may communicate (e.g., via a network or via a direct connection) with the computing device 406 that includes the AI engine 408.

Figure 7:
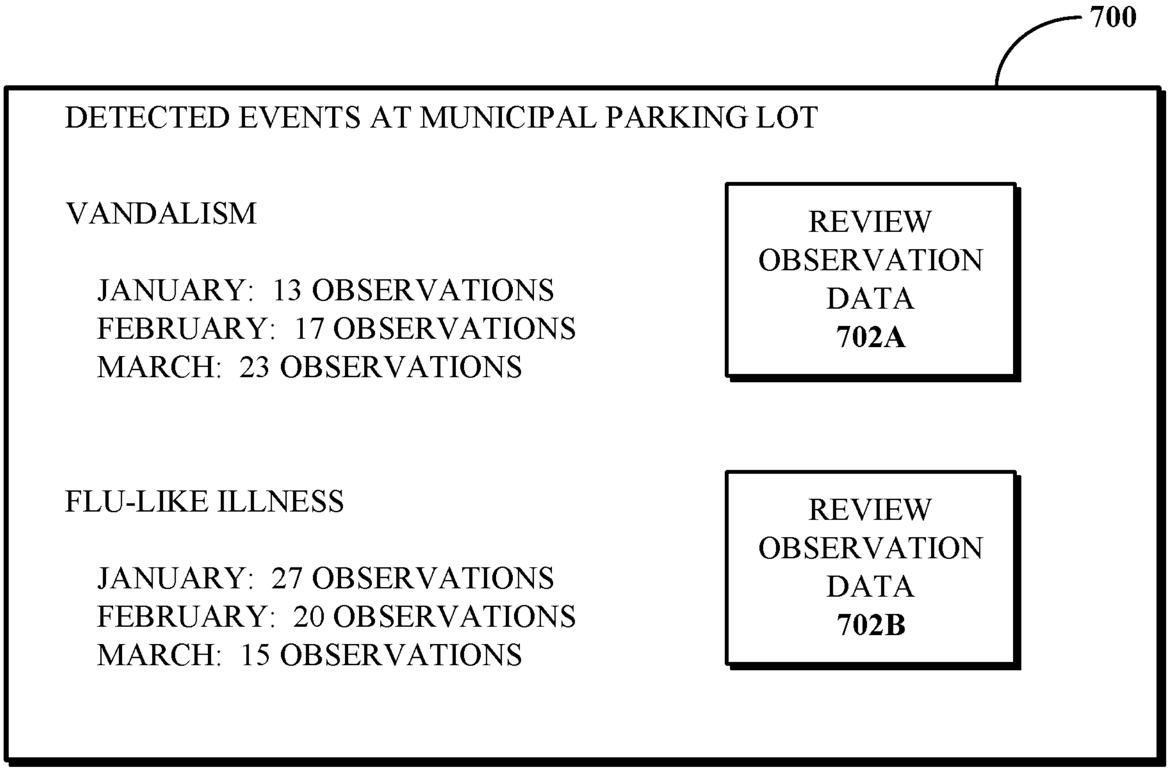
FIG. 7 illustrates an example of a detected event dashboard.

FIG. 7 illustrates an example of a detected event dashboard 700. The dashboard 700 may be generated by the computing device 406 or the output device 410 based on events identified by the AI engine 408 and output to the output device 410. The dashboard 700 may be presented at the output device 410 or another computing machine connected to the output device 410 or the computing device 406 via the network.

As shown, the dashboard 700 lists detected events at a municipal parking lot. These events may be of interest, for example, to a police department or a municipal government associated with the municipal parking lot. As illustrated, the dashboard 700 includes a section for the event "vandalism" and a section for the event "flu-like illness." For each event, the dashboard 700 lists the number of observations of the event in the months of January, February, and March. Each event also has a review observation data button 702A-B. When the review observation data button 702A-B is selected, additional information about at least one observation of the associated event (e.g., imagery or text output by the AI engine 408 in conjunction with the observation of the associated event) may be displayed.

A user reviewing the dashboard 700 may obtain useful insights about the detected events. For example, the dashboard 700 indicates that the number of vandalism incidents increased in each month between January and March, while the number of flu-like illness incidents decreased in each month between January and March. This may indicate that vandalism is becoming a bigger problem at the municipal parking lot while the flu season is ending. If the dashboard is being reviewed in the beginning of April, the municipality might, in some examples, determine that a police officer is to be stationed at the municipal parking lot to reduce the occurrence of vandalism. The municipality might also determine that the flu season is ending and that hospitals might need less capacity for handling flu-like illness.

Figure 8:
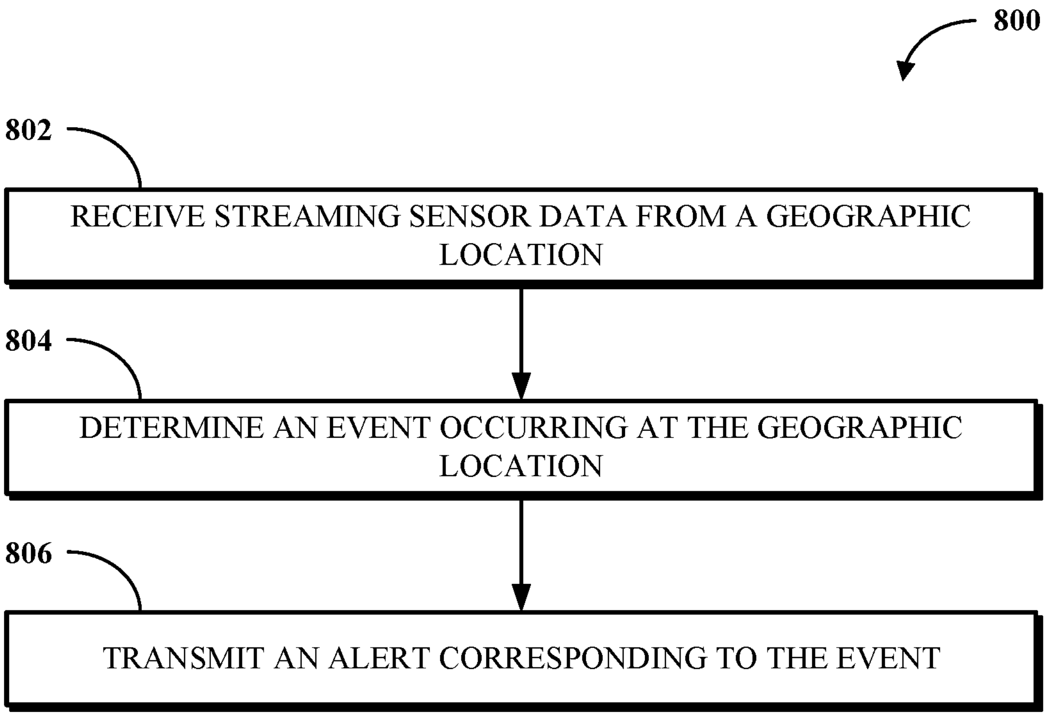
FIG. 8 is a flowchart of an example of a technique for generating a security alert using sensor data.

To further describe some implementations in greater detail, reference is next made to examples of techniques for security alert generation using sensor data. FIG. 8 is a flowchart of an example of a technique 800 for generating a security alert using sensor data. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a computing device (e.g., the computing device 406, which may include a single computing device or multiple computing devices) receives streaming sensor data from one or more security sensors (e.g., the security sensors 402) at a geographic location. In some cases, the security sensors include a thin AI engine (e.g., the thin AI engine 404). The thin AI engine may be trained to identify anomalies in the sensor data. Upon identifying an anomaly, the thin AI engine may generate a trigger signal for transmission to the computing device in conjunction with the streaming sensor data.

At 804, the computing device determines, using an AI engine (e.g., the AI engine 408) of the computing device, an event occurring (or predicted to occur) at the geographic location based on the streaming sensor data in real-time upon receiving the streaming sensor data. The event may correspond to a stored event type (e.g., at least one of vandalism, fighting, presence of unauthorized person, or flu-like illness) that the AI engine is trained to detect. In some examples, the AI engine includes at least one CNN and at least one transformer. The transformer may process speech data. The CNN may process at least one of visual data, non-verbal audio data, or thermal data. In determining the event occurring at the geographic location, the computing device may consider, among other things, the trigger signal received from the thin AI engine (or the fact that the trigger signal was not received).

At 806, the computing device transmits an alert corresponding to the event. The alert may be transmitted to a device or a communication address of a security guard or a security business associated with the geographic location. Alternatively, the alert may be transmitted to a device or a communication address of an owner or a tenant of the geographic location. In some implementation, to generate the alert, the AI engine generates a natural language description of the event (e.g., using a GPT of the AI engine). The AI engine determines, from the sensor data, a part of an image that corresponds to the event. The part of the image may be determined by a CNN of the AI engine. The alert is generated to include the part of the image and the natural language description on of the event.

In some cases, after detecting multiple events, (e.g., including the event determined or predicted to be occurring at 804) the AI engine generates a dashboard (e.g., the dashboard 700) of detected events. The dashboard represents the activity types of the event and/or the times of the events in a visual format. The dashboard may be transmitted to an administrator device (e.g., the output device 410 or another device) for display at the administrator device.

In one example use case, multiple cameras capable of recording video and audio observe a bank lobby. The cameras are connected, over a network, to a server of the bank. In addition, the set of cameras are connected to a local computer that is capable of rotating some of the cameras. In the lobby of the bank, there is a line of customers waiting to speak to the teller. A man wearing a ski mask walks into the bank and cuts to the front of the line of customers. A thin AI engine of the local computer determines, using a thin AI engine at the local computer, that the man is exhibiting anomalous behavior. As a result, the local computer sends an alert of the anomalous behavior to the server and causes the cameras to focus on the activity of the man. Upon approaching the teller, the man says, "I have a gun. Nobody move. Teller, put all the cash into this bag and nobody will be harmed." A video including imagery of the man and the audio of the man's speech is transmitted from the cameras, via the local computer, to the server. At the server, an AI engine determines that a bank robbery is ongoing based on the imagery of the man in the ski mask cutting in line (e.g., processed by a CNN) and the transcript of the words spoken by the man (e.g., obtained by a speech-to-text engine and processed by an LLM). The server generates an alert of the ongoing bank robbery, which may be transmitted to devices associated with the security staff of the bank, the management of the bank, and/or the closest police station to the bank.

Some implementations are described below as numbered examples (Example 1, 2, 3, etc.). These examples are provided as examples only and do not limit the other implementations disclosed herein.

Example 1 is a method, comprising: receiving, by one or more computing devices, streaming data from one or more security sensors at a geographic location, the one or more security sensors comprising at least one of a camera, a microphone, or a thermal sensor; determining, by an artificial intelligence engine at the one or more computing devices, an event occurring at the geographic location based on the streaming data based on receiving the streaming data, the artificial intelligence engine including at least one convolutional neural network and at least one transformer; and transmitting, to an output device, an alert corresponding to the event.

In Example 2, the subject matter of Example 1 includes, wherein the one or more security sensors include a thin artificial intelligence engine, wherein determining the event occurring at the geographic location comprises: receiving, by the one or more computing devices, a trigger signal generated by the thin artificial intelligence engine, the trigger signal being generated based on the streaming data; and verifying, by the artificial intelligence engine, that the trigger signal corresponds to the event associated with a stored event type, wherein the alert is transmitted based on a detection of the event associated with the stored event type.

In Example 3, the subject matter of Examples 1-2 includes, wherein the artificial intelligence engine includes a visual processing engine, an audio processing engine, and a thermal data processing engine, wherein determining the event is based on communication between at least two of the visual processing engine, the audio processing engine, or the thermal data processing engine.

In Example 4, the subject matter of Examples 1-3 includes, wherein the artificial intelligence engine comprises a convolutional neural network for human body recognition, a transformer engine for natural language processing, and a convolutional neural network for non-verbal audio signal processing, wherein the event is determined based on a combination of an output of the convolutional neural network for human body recognition, an output of the transformer engine for natural language processing, and an output of the convolutional neural network for non-verbal audio signal processing.

In Example 5, the subject matter of Examples 1-4 includes, wherein the one or more computing devices are physically distinct from the one or more security sensors, wherein the streaming data is received using a network connection.

In Example 6, the subject matter of Examples 1-5 includes, generating, by the artificial intelligence engine, a natural language description; and determining, by the artificial intelligence engine and within the streaming data, a part of an image that corresponds to the event, wherein the alert comprises the part of the image and the natural language description of the event.

In Example 7, the subject matter of Examples 1-6 includes, wherein the output device comprises a client device of security personnel or a messaging server for communicating with the security personnel.

In Example 8, the subject matter of Examples 1-7 includes, generating, by the artificial intelligence engine, a dashboard of determined events, including the event, over a time period, the dashboard representing at least one of event types or times of the determined events; and transmitting the dashboard to an administrator device.

Example 9 is a non-transitory computer readable medium storing instructions operable to cause one or more processors to perform operations comprising: receiving, by one or more computing devices, streaming data from one or more security sensors at a geographic location, the one or more security sensors comprising at least one of a camera, a microphone, or a thermal sensor; determining, by an artificial intelligence engine at the one or more computing devices, an event occurring at the geographic location based on the streaming data based on receiving the streaming data, the artificial intelligence engine including at least one convolutional neural network and at least one transformer; and transmitting, to an output device, an alert corresponding to the event.

In Example 10, the subject matter of Example 9 includes, wherein the one or more security sensors include a thin artificial intelligence engine, wherein determining the event occurring at the geographic location comprises: receiving a trigger signal generated by the thin artificial intelligence engine, the trigger signal being generated based on the streaming data; and verifying, by the artificial intelligence engine, that the trigger signal corresponds to the event associated with a stored event type, wherein the alert is transmitted based on a detection of the event associated with the stored event type.

In Example 11, the subject matter of Examples 9-10 includes, wherein the artificial intelligence engine includes a visual processing engine and an audio processing engine, wherein determining the event is based on communication between the visual processing engine and the audio processing engine.

In Example 12, the subject matter of Examples 9-11 includes, wherein the artificial intelligence engine comprises a convolutional neural network for human body recognition and a transformer engine for natural language processing, wherein the event is determined based on a combination of an output of the convolutional neural network and an output of the transformer engine.

In Example 13, the subject matter of Examples 9-12 includes, wherein the one or more computing devices are physically distinct from the one or more security sensors, wherein the streaming data is received via a network.

In Example 14, the subject matter of Examples 9-13 includes, the operations further comprising: generating a natural language description of the event; and determining, within the streaming data, a part of an image that corresponds to the event, wherein the alert comprises the part of the image and the natural language description of the event.

In Example 15, the subject matter of Examples 9-14 includes, wherein the output device comprises a messaging server for communicating via an application for communication between two or more humans.

In Example 16, the subject matter of Examples 9-15 includes, the operations further comprising: generating, by the artificial intelligence engine, a dashboard of determined events, including the event, the dashboard representing at least one of event types or times of the determined events; and transmitting the dashboard to an administrator device.

Example 17 is a system, comprising: a memory subsystem; and processing circuitry configured to execute instructions stored in the memory subsystem to: receiving, by one or more computing devices, streaming data from one or more security sensors at a geographic location, the one or more security sensors comprising at least one of a camera, a microphone, or a thermal sensor; determining, by an artificial intelligence engine at the one or more computing devices, an event occurring at the geographic location based on the streaming data based on receiving the streaming data, the artificial intelligence engine including at least one convolutional neural network and at least one transformer; and transmitting, to an output device, an alert corresponding to the event.

In Example 18, the subject matter of Example 17 includes, wherein the one or more security sensors include a thin artificial intelligence engine, wherein determining the event occurring at the geographic location comprises: receiving a trigger signal generated by the thin artificial intelligence engine, the trigger signal being generated based on the streaming data; and verifying, by the artificial intelligence engine, that the trigger signal corresponds to the event.

In Example 19, the subject matter of Examples 17-18 includes, wherein the artificial intelligence engine includes an audio processing engine and a thermal data processing engine, wherein determining the event is based on communication between the audio processing engine and the thermal data processing engine.

In Example 20, the subject matter of Examples 17-19 includes, wherein the artificial intelligence engine comprises a convolutional neural network for non-verbal audio processing and a transformer engine for natural language processing, wherein the event is determined based on a combination of an output of the convolutional neural network and an output of the transformer engine.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words “mechanism” and “component” are used broadly and are not limited to mechanical or physical implementations, but can include software routines in conjunction with processors, etc. Likewise, the terms “system” or “tool” as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, by one or more computing devices, streaming data from one or more security sensors at a geographic location, the one or more security sensors comprising at least one of a camera, a microphone, or a thermal sensor;

determining, by an artificial intelligence engine at the one or more computing devices, an event occurring at the geographic location based on the streaming data, the artificial intelligence engine including at least one convolutional neural network and at least one transformer, wherein determining the event comprises processing visual data using the at least one convolutional neural network and processing audio data using the at least one transformer, and wherein the artificial intelligence engine determines the event based on transmission of a predicted event based on visual data from a visual processing engine that includes the at least one convolutional neural network to an audio processing engine that includes the at least one transformer; and transmitting, to an output device, an alert corresponding to the event.

2. The method of claim 1, wherein the one or more security sensors include a thin artificial intelligence engine, wherein determining the event occurring at the geographic location comprises:

receiving, by the one or more computing devices, a trigger signal generated by the thin artificial intelligence engine, the trigger signal being generated based on the streaming data; and verifying, by the artificial intelligence engine, that the trigger signal corresponds to the event associated with a stored event type, wherein the alert is transmitted based on a detection of the event associated with the stored event type.

3. The method of claim 1, wherein the artificial intelligence engine includes the visual processing engine, the audio processing engine, and a thermal data processing engine, wherein determining the event is based on communication between at least two of the visual processing engine, the audio processing engine, or the thermal data processing engine.

4. The method of claim 1, wherein the artificial intelligence engine comprises a convolutional neural network for human body recognition, a transformer engine for natural language processing, and a convolutional neural network for non-verbal audio signal processing, wherein the event is determined based on a combination of an output of the convolutional neural network for human body recognition, an output of the transformer engine for natural language processing, and an output of the convolutional neural network for non-verbal audio signal processing.

5. The method of claim 1, wherein the one or more computing devices are physically distinct from the one or more security sensors, wherein the streaming data is received using a network connection.

6. The method of claim 1, further comprising:

generating, by the artificial intelligence engine, a natural language description; and determining, by the artificial intelligence engine and within the streaming data, a part of an image that corresponds to the event, wherein the alert comprises the part of the image and the natural language description of the event.

7. The method of claim 1, wherein the output device comprises a client device of security personnel or a messaging server for communicating with the security personnel.

8. The method of claim 1, further comprising:

generating, by the artificial intelligence engine, a dashboard of determined events, including the event, over a time period, the dashboard representing at least one of event types or times of the determined events; and transmitting the dashboard to an administrator device.

9. A non-transitory computer readable medium storing instructions operable to cause one or more processors to perform operations comprising:

receiving, by one or more computing devices, streaming data from one or more security sensors at a geographic location, the one or more security sensors comprising at least one of a camera, a microphone, or a thermal sensor;

determining, by an artificial intelligence engine at the one or more computing devices, an event occurring at the geographic location based on the streaming data, the artificial intelligence engine including at least one convolutional neural network and at least one transformer, wherein determining the event comprises processing visual data using the at least one convolutional neural network and processing audio data using the at least one transformer, and wherein the artificial intelligence engine determines the event based on transmission of a predicted event based on visual data from a visual processing engine that includes the at least one convolutional neural network to an audio processing engine that includes the at least one transformer; and transmitting, to an output device, an alert corresponding to the event.

10. The non-transitory computer readable medium of claim 9, wherein the one or more security sensors include a thin artificial intelligence engine, wherein determining the event occurring at the geographic location comprises:

receiving a trigger signal generated by the thin artificial intelligence engine, the trigger signal being generated based on the streaming data; and verifying, by the artificial intelligence engine, that the trigger signal corresponds to the event associated with a stored event type, wherein the alert is transmitted based on a detection of the event associated with the stored event type.

11. The non-transitory computer readable medium of claim 9, wherein the artificial intelligence engine includes the visual processing engine and the audio processing engine, wherein determining the event is based on communication between the visual processing engine and the audio processing engine.

12. The non-transitory computer readable medium of claim 9, wherein the artificial intelligence engine comprises a convolutional neural network for human body recognition and a transformer engine for natural language processing, wherein the event is determined based on a combination of an output of the convolutional neural network and an output of the transformer engine.

13. The non-transitory computer readable medium of claim 9, wherein the one or more computing devices are physically distinct from the one or more security sensors, wherein the streaming data is received via a network.

14. The non-transitory computer readable medium of claim 9, the operations further comprising:

generating a natural language description of the event; and determining, within the streaming data, a part of an image that corresponds to the event, wherein the alert comprises the part of the image and the natural language description of the event.

15. The non-transitory computer readable medium of claim 9, wherein the output device comprises a messaging server for communicating via an application for communication between two or more humans.

16. The non-transitory computer readable medium of claim 9, the operations further comprising:

generating, by the artificial intelligence engine, a dashboard of determined events, including the event, the dashboard representing at least one of event types or times of the determined events; and transmitting the dashboard to an administrator device.

17. A system, comprising:

a memory subsystem; and processing circuitry configured to execute instructions stored in the memory subsystem to:

receiving, by one or more computing devices, streaming data from one or more security sensors at a geographic location, the one or more security sensors comprising at least one of a camera, a microphone, or a thermal sensor;

determining, by an artificial intelligence engine at the one or more computing devices, an event occurring at the geographic location based on the streaming data, the artificial intelligence engine including at least one convolutional neural network and at least one transformer, wherein determining the event comprises processing visual data using the at least one convolutional neural network and processing audio data using the at least one transformer, and wherein the artificial intelligence engine determines the event based on transmission of a predicted event based on visual data from a visual processing engine that includes the at least one convolutional neural network to an audio processing engine that includes the at least one transformer; and transmitting, to an output device, an alert corresponding to the event.

18. The system of claim 17, wherein the one or more security sensors include a thin artificial intelligence engine, wherein determining the event occurring at the geographic location comprises:

receiving a trigger signal generated by the thin artificial intelligence engine, the trigger signal being generated based on the streaming data; and verifying, by the artificial intelligence engine, that the trigger signal corresponds to the event.

19. The system of claim 17, wherein the artificial intelligence engine includes the audio processing engine and a thermal data processing engine, wherein determining the event is based on communication between the audio processing engine and the thermal data processing engine.

20. The system of claim 17, wherein the artificial intelligence engine comprises a convolutional neural network for non-verbal audio processing and a transformer engine for natural language processing, wherein the event is determined based on a combination of an output of the convolutional neural network and an output of the transformer engine.

* * * * *